(12) United States Patent
Imai et al.

(10) Patent No.: US 9,778,128 B2
(45) Date of Patent: Oct. 3, 2017

(54) PRESSURE SENSOR (71) Applicant: Surpass Industry Co., Ltd., Saitama (JP)

(72) Inventors: Hiroshi Imai, Saitama (JP); Toshiyuki Takanohashi, Saitama (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 428 days.

(21) Appl. No.: 14/380,340

(22) PCT Filed: Jan. 31, 2013

(86) PCT No.: PCT/JP2013/052122
§ 371 (c)(1),
(2) Date: Aug. 21, 2014

(87) PCT Pub. No.: WO2013/125317
PCT Pub. Date: Aug. 29, 2013

(65) Prior Publication Data
US 2015/0013467 A1 Jan. 15, 2015

(30) Foreign Application Priority Data
Feb. 24, 2012 (JP) .................................. 2012-039195

(51) Int. Cl.
*G01L 19/00* (2006.01)
(52) U.S. Cl.
CPC ................................. *G01L 19/0023* (2013.01)
(58) Field of Classification Search
CPC .................... G01L 19/0007; G01L 19/0023
See application file for complete search history.

(56) References Cited

U.S. PATENT DOCUMENTS

| 4,462,409 | A | 7/1984 | Pace et al. |
| 6,948,373 | B2 | 9/2005 | Imai |
| 8,490,645 | B2 | 7/2013 | Igarashi |
| 2011/0214757 | A1* | 9/2011 | Igarashi ................. G01F 1/363 |
| | | | 137/511 |

FOREIGN PATENT DOCUMENTS

| JP | H 06-249735 A | 9/1994 |
| JP | 2005-010078 A | 1/2005 |
| JP | 2008-207121 A | 9/2008 |
| JP | 2011-185635 A | 9/2011 |

OTHER PUBLICATIONS

Extended European Search Report for European Application No. 13751347.9 dated Oct. 2, 2015.

* cited by examiner

*Primary Examiner* — Erika J Villaluna
(74) *Attorney, Agent, or Firm* — Muncy, Geissler, Olds & Lowe, P.C.

(57) ABSTRACT

A pressure sensor is provided, which includes a pressure detector that has a pressure receiving surface in contact with a liquid, and detects a pressure of the liquid to a pressure receiving section, and a housing having a housing inner wall that demarcates a liquid chamber, wherein the housing inner wall is provided with an inflow hole, and an outflow hole, at least a part of a connecting portion, which is connected to the pressure receiving surface, of the housing inner wall is formed as an inner wall of the outflow hole, and the housing inner wall at the portion formed as the inner wall of the outflow hole protrudes more outward of the liquid chamber than the other connecting portion adjacent to the portion formed as the inner wall of the outflow hole.

19 Claims, 8 Drawing Sheets

PRESSURE SENSOR

CROSS REFERENCE TO RELATED APPLICATIONS

This application is a National Phase of International Application No. PCT/JP2013/052122, filed on Jan. 31, 2013, for which priority is claimed under 35 U.S.C. §371, which claims priority to Application No. 2012-039195 filed in Japan on Feb. 24, 2012, the entire contents of all of which are hereby incorporated by reference.

TECHNICAL FIELD

The present invention relates to a pressure sensor that detects a pressure of a liquid.

BACKGROUND ART

Conventionally, pressure sensors have been used to detect the pressures of liquids that flow in channels. As the pressure sensors, pressure sensors called a single port type that branches a liquid from a main channel where the liquid flows, to a branch channel, and detects the pressure of the branched liquid are generally used. However, a single port type pressure sensor has the problem that the branched pipe portion becomes a dead volume, and the problem that the liquid staying in the branched pipe portion degrades.

Consequently, a pressure sensor called an inline type that detects the pressure of the liquid flowing in a main channel without branching the liquid to a branch channel from the main channel has been developed. For example, PTL 1 discloses an inline type pressure sensor that includes, as the channels in the housing of the pressure sensor, the first channel that changes a flow from the main channel to the liquid chamber which is provided with a pressure receiving section, the second channel where the flow goes along the liquid chamber, and the third channel that changes a flow direction from the liquid chamber to the main channel.

CITATION LIST

Patent Literature

{PTL 1}
Japanese Unexamined Patent Application, Publication No. 2005-10078

SUMMARY OF INVENTION

Technical Problem

However, in the pressure sensor disclosed in PTL 1, the outflow hole for a liquid which is provided in the housing inner wall of the pressure sensor, which demarcates the liquid chamber, is provided at a center side of the pressure receiving surface from the end portion of the pressure receiving surface including the pressure receiving section. Thereby, there arises the trouble in which air bubbles and the like stay in the connecting portion, which is connected to the pressure receiving surface, of the housing inner wall, and the air bubbles and the like which stay therein collectively flow out to vary the flow rate of the liquid.

Solution to Problem

In order to solve the above described problem, the present invention adopts the following solution.

A pressure sensor according to the present invention includes a pressure detector that has a pressure receiving surface in contact with a liquid, and detects a pressure of the liquid in a pressure receiving section included in the pressure receiving surface, and a housing having a housing inner wall that demarcates a liquid chamber together with the pressure receiving surface, wherein the housing inner wall is provided with an inflow hole that causes the liquid to flow into the liquid chamber, and an outflow hole that causes the liquid to flow out of the liquid chamber, at least a part of a connecting portion, which is connected to the pressure receiving surface, of the housing inner wall is formed to be an inner wall of the outflow hole, and the housing inner wall at the portion formed to be the inner wall of the outflow hole protrudes more outward of the liquid chamber than the housing inner wall at the other connecting portion adjacent to the portion formed to be the inner wall of the outflow hole.

In the pressure sensor according to the present invention, at least a part of the connecting portion, which is connected to the pressure receiving surface, of the housing inner wall which demarcates the liquid chamber together with the pressure receiving surface is formed to be the inner wall of the outflow hole, and the housing inner wall at the portion formed to be the inner wall of the outflow hole protrudes more outward of the liquid chamber than the housing inner wall at the other connecting portion adjacent to the portion formed to be the inner wall of the outflow hole. Accordingly, the trouble in which air bubbles and the like stay in the connecting portion, which is connected to the pressure receiving surface, of the housing inner wall, and the air bubbles and the like which stay therein collectively flow out to vary the flow rate of the liquid can be restrained.

In the pressure sensor according to a first aspect of the present invention, the housing has an inflow channel that causes a liquid that flows in from an outside of the pressure sensor to flow into the liquid chamber, and the inflow channel causes the liquid that flows in from the outside of the pressure sensor to flow into the liquid chamber without branching the liquid to another channel. According to the pressure sensor according to the first aspect of the present invention, the liquid which flows in from the outside of the pressure sensor is caused to flow into the liquid chamber without being branched to another channel, and therefore, the problem of the branched pipe portion becoming a dead volume, and the problem of the liquid staying in the branched pipe portion degrading can be avoided.

In the pressure sensor according to a second aspect of the present invention, a plan view of the pressure receiving surface is substantially circular, and a conditional expression as follows is satisfied:

$$-0.5 \leq (r1-r2)/r3 \leq 0.9 \quad (1)$$

where
r1: a distance from a center of the pressure receiving surface to an end portion of the pressure receiving surface,
r2: a distance from the center of the pressure receiving surface to a center of the outflow hole, and
r3: a distance from the center of the outflow hole to an inner wall of the outflow hole.

The pressure sensor according to the second aspect of the present invention is configured to satisfy conditional expression (1) in order to protrude the housing inner wall at the portion formed as the inner wall of the outflow hole more outward of the liquid chamber than the housing inner wall at the other connecting portion. By being configured like this, the space in which air bubbles and the like can stay in the connecting portion, which is connected to the pressure receiving surface, of the housing inner wall can be decreased. Thereby, the trouble in which air bubbles and the like stay in the liquid chamber, and the air bubbles and the like which stay therein collectively flow out to vary the flow rate of the liquid can be restrained.

The pressure sensor according to the second aspect of the present invention may be further configured to satisfy a conditional expression as follows:

$$-0.5 \leq (r1-r2)/r3 \leq 0.8 \quad (2)$$

In the pressure sensor of the configuration as above, the housing inner wall at the portion formed as the inner wall of the outflow hole is protruded more outward of the liquid chamber than the housing inner wall at the other connecting portion, and the center of the outflow hole is disposed at a proper position nearer to the center of the pressure receiving surface than the end portion of the pressure receiving surface. This prevents the situation in which the center of the outflow hole is located at the position farther from the center of the pressure receiving surface than the end portion of the pressure receiving surface to reduce the outflow efficiency of the liquid to the outflow hole from the liquid chamber.

In the pressure sensor according to a third aspect of the present invention, a plan view of the pressure receiving surface is substantially circular, a plan view of the pressure receiving section is substantially circular, and a conditional expression as follows is satisfied:

$$r2-r3 \leq r4 \leq r1 \quad (3)$$

where
r1: a distance from a center of the pressure receiving surface to an end portion of the pressure receiving surface,
r2: a distance from the center of the pressure receiving surface to a center of the outflow hole,
r3: a distance from the center of the outflow hole to an inner wall of the outflow hole, and
r4: a distance from a center of the pressure receiving section to an end portion of the pressure receiving section.

The pressure sensor according to the third aspect of the present invention satisfies conditional expression (3) to cause the end portion of the pressure receiving section to overlap the outflow hole. This can eliminate the trouble in which the end portion of the pressure receiving section is located at the position where the end portion does not overlap the outflow hole and the area of the pressure receiving section cannot be sufficiently ensured. Accordingly, the pressure sensor that sufficiently ensures the area of the pressure receiving section and enhances detection precision of the pressure of the liquid can be provided.

In the pressure sensor according to a fourth aspect of the present invention, at least a part of the connecting portion is formed as an inner wall of the inflow hole, and the housing inner wall at the portion formed as the inner wall of the inflow hole protrudes more outward of the liquid chamber than the other connecting portion adjacent to the portion formed as the inner wall of the inflow hole.

In the pressure sensor according to the fourth aspect of the present invention, at least a part of the portion, which is connected to the pressure receiving surface, of the housing inner wall is formed as the inner wall of the inflow hole, and the housing inner wall at the portion formed as the inner wall of the inflow hole protrudes more outward of the liquid chamber than the housing inner wall at the other connecting portion adjacent to the portion formed as the inner wall of the inflow hole. Accordingly, the trouble in which air bubbles and the like stay in the connecting portion, which is connected to the pressure receiving surface, of the housing inner wall, and the air bubbles and the like which stay therein collectively flow out to vary the flow rate of the liquid can be restrained.

In the pressure sensor according to a fifth aspect of the present invention, a center of the inflow hole, a center of the outflow hole, and a center of the pressure receiving surface are disposed on a same straight line. In the pressure sensor according to the fifth aspect of the present invention, the center of the pressure receiving surface is disposed on the straight line connecting the center of the inflow hole and the center of the outflow hole, and therefore, the liquid moves smoothly from the inflow hole to the outflow hole in the liquid chamber. This can further restrain the trouble in which air bubbles and the like stay in the liquid chamber, and the air bubbles and the like which stay therein collectively flow out to vary the flow rate of the liquid.

In the pressure sensor according to a fifth aspect of the present invention, a configuration may be further adopted, in which the straight line connecting the center of the inflow hole and the center of the outflow hole is located in a vertical direction, and the outflow hole is disposed at an upper position in the vertical direction. In the pressure sensor with the configuration like this, the outflow hole is disposed in the upper position in the vertical direction of the liquid chamber, and therefore, the air bubbles and the like having specific gravities smaller than the liquid easily flow out of the outflow hole. This can further restrain the trouble in which air bubbles and the like stay in the liquid chamber, and the air bubbles and the like that stay therein collectively flow out to vary the flow rate of the liquid.

In the pressure sensor according to the first aspect of the present invention described above, a configuration may be further adopted, in which the housing includes a first connecting section to which a joint provided at a first conduit in which a liquid flowing into the pressure sensor flows is connected, a second connecting portion to which a joint provided at a second conduit in which the liquid flowing out of the pressure sensor flows is connected, and an outflow channel that changes a flow direction from the outflow hole of the liquid chamber to a same straight line as the second conduit, and the inflow channel changes the flow direction from a same straight line as the first conduit to the inflow hole of the liquid chamber.

In the pressure sensor with the configuration like this, the inflow channel changes the flow direction of the liquid which flows in from the first conduit toward the inflow hole of the liquid chamber, and the outflow channel changes the flow direction of the liquid which flows out of the outflow hole in the liquid chamber toward the second conduit. This can cause the liquid to flow properly without providing a dead volume even when the liquid chamber is not disposed on the same straight line as the first conduit and the second conduit.

Further, in the pressure sensor with the configuration as above, the first conduit and the second conduit are disposed substantially parallel with the pressure receiving surface, the inflow channel may be a channel that changes a flow direction from the same straight line as the first conduit toward a direction substantially orthogonal to the pressure receiving surface, and the outflow channel may be a channel that changes a flow direction from the direction substantially orthogonal to the pressure receiving surface toward the same straight line as the second conduit. This can cause the liquid to flow in from the direction substantially orthogonal to the pressure receiving surface, and can cause the liquid to flow out to the direction substantially orthogonal to the pressure receiving surface.

Advantageous Effects of Invention

According to the present invention, the pressure sensor can be provided, which restrains the trouble in which air bobbles and the like stay in the liquid chamber, and the air bubbles and the like which stay therein collectively flow out to vary the flow rate of the liquid.

DESCRIPTION OF EMBODIMENTS

First Embodiment

Figure 1:
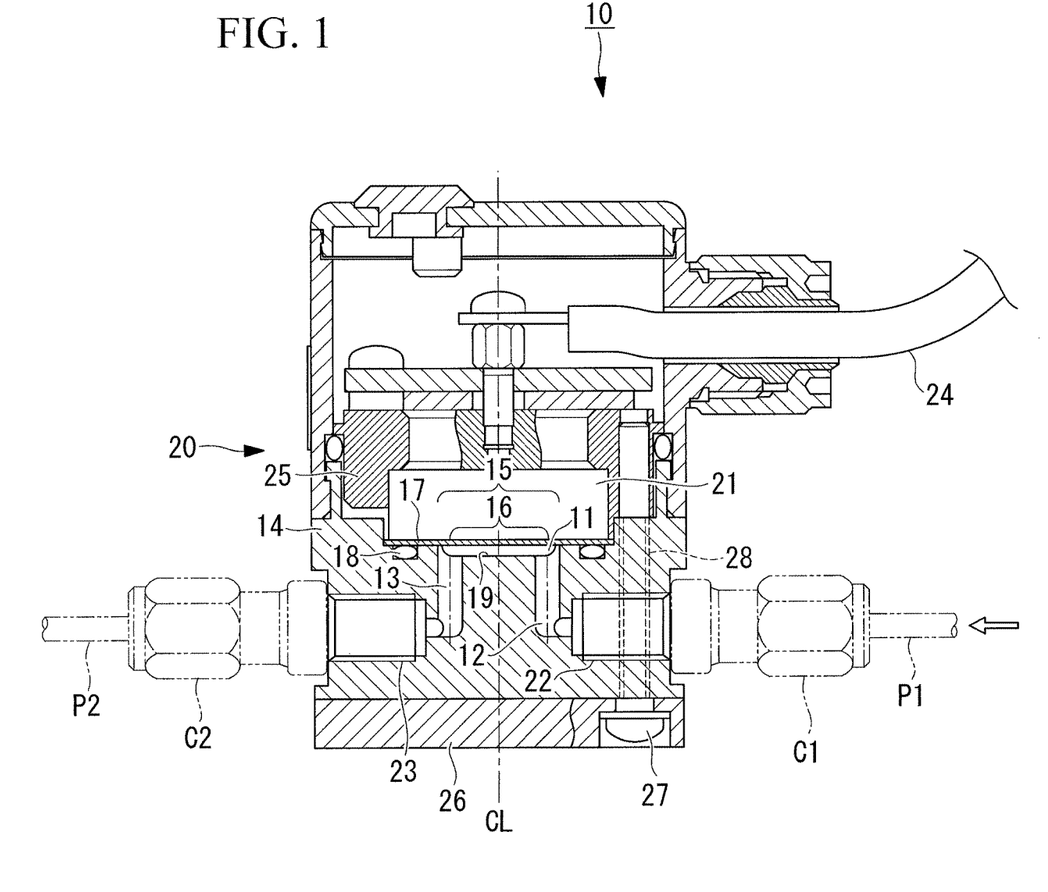
FIG. 1 is a sectional view showing an internal structure of a pressure sensor of a first embodiment of the present invention.

Hereinafter, a pressure sensor of a first embodiment of the present invention will be described based on the drawings. FIG. 1 is a sectional view showing an internal structure of the pressure sensor of the first embodiment.

A pressure sensor 10 shown in FIG. 1 detects a pressure of a liquid such as a chemical solution that flows in from a first conduit P1 and flows out from a second conduit P2 via a liquid chamber 11. The liquid which is flows in from the first conduit P1 flows into the liquid chamber 11 via an inflow channel 12, and flows out to the second conduit P2 via an outflow channel 13 from the liquid chamber 11. Here, the first conduit P1 and the inflow channel 12 provided in a housing 14 are connected to each other by a first joint C1. Further, the second conduit P2 and the outflow channel 13 provided in the housing 14 are connected to each other by a second joint C2.

The housing 14 is provided with a first connecting section 22 to which the first joint C1 is connected by being screwed thereon, and a second connecting section 23 to which the second joint C2 is connected by being screwed thereon. The first conduit P1 and the second conduit P2 are disposed on the same straight line. The inflow channel 12 is a channel that changes a flow direction of the liquid from the same straight line as the first conduit P1 toward the center line CL direction substantially orthogonal to a pressure receiving surface 15 (described later) of the liquid chamber 11. Further, the outflow channel 13 is a channel that changes the flow direction from the center line CL direction substantially orthogonal to the pressure receiving surface 15 (described later) toward the same straight line as the second conduit P2.

The housing 14 includes the inflow channel 12 that causes the liquid which flows in from an outside of the pressure sensor 10 to flow into the liquid chamber 11, and the outflow channel 13 that causes the liquid to flow out to the outside of the pressure sensor 10 from the liquid chamber 11. The inflow channel 12 causes the total amount of the liquid that flows in from the outside of the pressure sensor 10 via the first conduit P1 to flow into the liquid chamber 11 without branching the fluid to another channel.

The housing 14 has a housing inner wall 19 that demarcates the liquid chamber 11 together with the pressure receiving surface 15 which will be described later. The housing inner wall 19 demarcates a space that opens in an upward direction along the center line CL of the pressure sensor 10. The housing inner wall 19 includes a bottom surface 19a that is perpendicular to the center line CL and substantially circular in plan view in the center line CL direction, and a side surface 19b that gradually changes to a direction parallel with the center line CL from the bottom surface 19a.

A sheet 17 is disposed over the housing inner wall 19 including the bottom surface 19a and the side surface 19b, and a pressure detector 20 is disposed over the sheet 17. The pressure detector 20 has a pressure detecting element 21 and the sheet 17 that functions as the pressure receiving surface 15 which is in contact with the liquid in the liquid chamber 11.

The sheet 17 is a sheet that is disposed to cover an entire space that is demarcated by the housing inner wall 19, and functions as a protection sheet that prevents the pressure detecting element 21 from directly contacting the liquid such as a chemical solution. As the sheet 17, a sheet of a fluororesin such as polytetrafluoroethylene (PTFE) is preferably used. Of the sheet 17, a portion that faces the liquid chamber 11 corresponds to the pressure receiving surface 15. The pressure receiving surface 15 is a surface that is in contact with the liquid when the liquid chamber 11 is filled with the liquid. Further, the pressure receiving surface 15 includes a pressure receiving section 16, and the pressure detecting element 21 detects the pressure of the liquid which is applied to the pressure receiving section 16 from the liquid filled in the liquid chamber 11.

The sheet 17 is substantially circular in plan view from the center line CL direction, and the pressure receiving surface 15 corresponding to an inner circumferential portion thereof is in contact with the liquid in the liquid chamber 11. An outer circumferential portion of the sheet 17 is in contact with the housing 14. The pressure receiving surface 15 is substantially circular in plan view from the center line CL direction similarly to the sheet 17.

In a part of the housing 14 at a portion in contact with the sheet 17, a circular groove with the center line CL as an axis is engraved, and an O-ring 18 is disposed in the groove portion. The O-ring 18 functions as a seal member for preventing the liquid in the liquid chamber 11 from flowing out to the outside.

The pressure detecting element 21 includes a diaphragm (not illustrated) that is in contact with the pressure receiving section 16, and detects the pressure of the liquid which is applied to the diaphragm via the pressure receiving section 16. As the pressure detecting element 21, various elements such as a strain gauge are usable. For example, a semiconductor pressure detecting element that uses a silicon substrate processed to be thin as a diaphragm, and detects a change in a resistance value of the diaphragm corresponding to a deflection amount of the diaphragm is usable. The pressure detected by the pressure detecting element 21 is transmitted to an external apparatus (not illustrated) via a cable 24.

A cylindrical presser member 25 with the center line CL as a center axis is disposed in an upper portion of the pressure detector 20. Further, a base 26 is disposed at a lower portion of the housing 14. The base member 26 and the presser member 25 are fastened with a screw 27 via a threaded hole 28 provided in the housing 14, whereby the pressure detector 20 is fixed in a state in close contact with the housing 14.

Next, the pressure receiving surface 15 and the pressure receiving section 16 of the sheet 17 will be described with use of FIG. 2.

Figure 2:
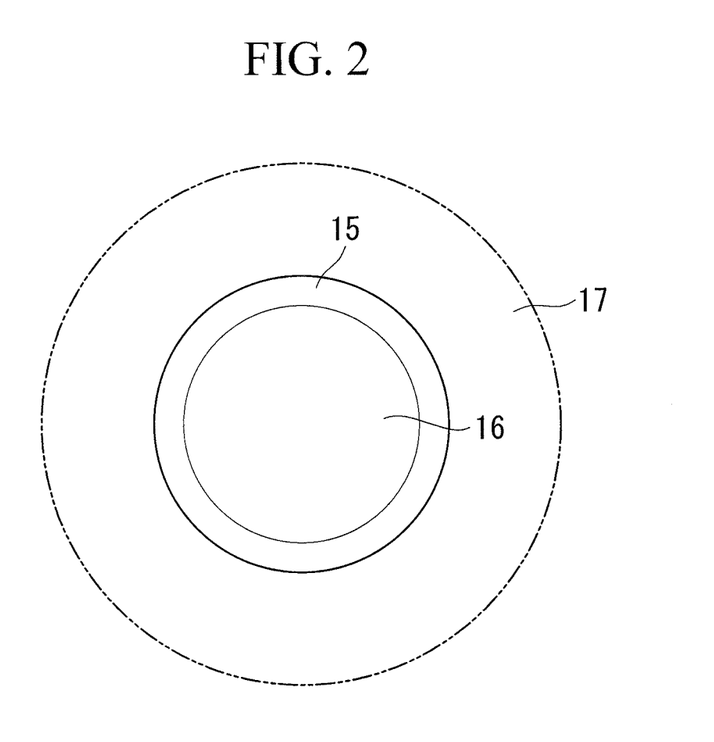
FIG. 2 is a plan view showing a sheet 17 of the first embodiment of the present invention.

FIG. 2 is a plan view of a case in which the sheet 17 is visually recognized from the liquid chamber 11 side in the center line CL direction. A center position of a circular shape corresponds to the center line CL, and an outer side with respect to the center position from the pressure receiving surface 15 is a portion that is in contact with the housing 14. The pressure receiving surface 15 is a part of the sheet 17 and corresponds to a portion with which the liquid in the liquid chamber 11 is in contact.

The pressure receiving section 16 is a section to which a pressure to be detected by the pressure detecting element 21 is applied. On a surface at a side, which is not in contact with the liquid, of the pressure receiving section 16, the diaphragm (not illustrated) of the pressure detecting element 21 is disposed in a state in contact therewith. Accordingly, in the pressure receiving surface 15, the pressure of the liquid, which is applied to the pressure receiving section 16, is detected by the pressure detecting element 21, and the pressure of the liquid, which is applied to the other region, is not detected by the pressure detecting element 21. The pressure receiving section 16 is formed into a substantially circular shape in plan view from the center line CL direction, similarly to the pressure receiving surface 15.

As above, the pressure detecting section 20 has the pressure receiving surface 15 which is in contact with the liquid, and detects the pressure of the liquid to the pressure receiving section 16 which is included in the pressure receiving surface 15 by using the pressure detecting element 21. Further, the housing 14 has the housing inner wall 19 which demarcates the liquid chamber 11 together with the pressure receiving surface 15.

Figure 3:
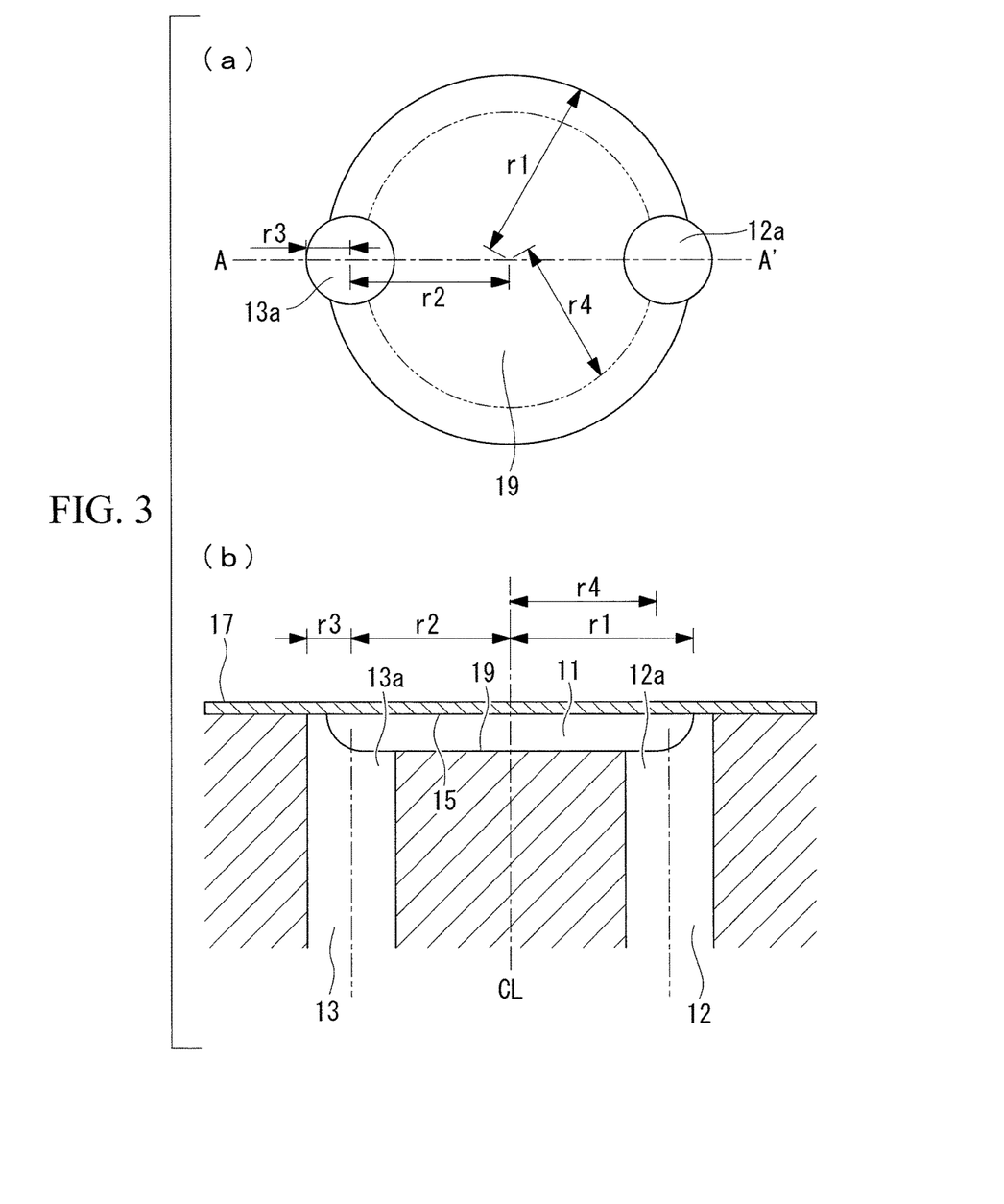
FIG. 3 is a view showing an inflow hole 12a and an outflow hole 13a of the first embodiment of the present invention, (a) is a plan view seen in a center line CL direction from above a housing, and (b) is a sectional view taken along line A-A' in (a).
Figure 4:
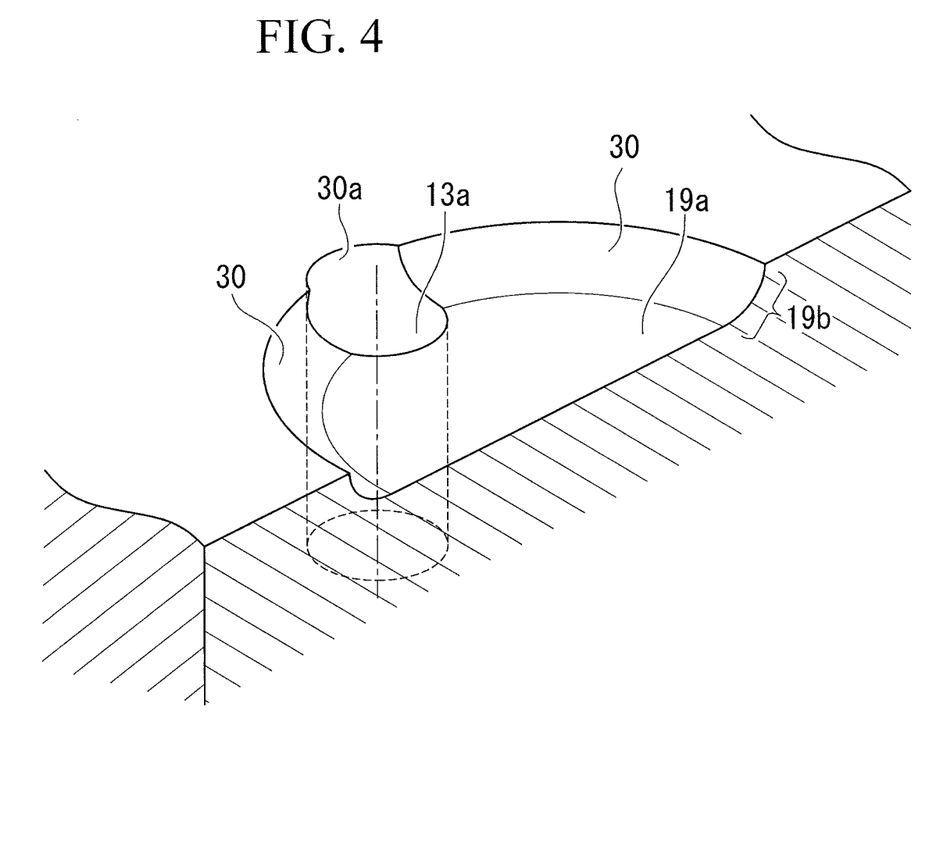
FIG. 4 is perspective sectional view taken along line A-A' of a liquid chamber 11 formed in a housing 14 of the first embodiment.

Next, an inflow hole 12a and an outflow hole 13a that are provided in the housing 14 will be described with use of FIG. 3 and FIG. 4. FIG. 3 is a view showing the inflow hole 12a and the outflow hole 13a of the first embodiment. FIG. 3(a) is a plan view seen in the center line CL direction from above the housing 14, and FIG. 3(b) is a sectional view taken along line A-A' in FIG. 3(a). Further, FIG. 4 is a perspective sectional view taken along line A-A' of the liquid chamber 11 which is formed in the housing 14 of the first embodiment.

FIG. 3(a) is the plan view in the case of being seen from above the housing 14 along the center line CL in a state in which the pressure detector 20 is not disposed in the housing 14. Note that while FIG. 3(a) shows the state in which the sheet 17 is not disposed, the portion of the sheet 17, which corresponds to the pressure receiving section 16 is shown by the dotted line.

As shown in FIG. 3(a) and FIG. 3(b), the housing inner wall 19 is provided with the inflow hole 12a which allows a fluid to flow into the liquid chamber 11, and the outflow hole 13a which allows the liquid to flow out of the liquid chamber 11.

In FIG. 3, reference signs r1, r2, r3 and r4 respectively represent the following.

r1: a distance from a center of the pressure receiving surface 15 to an end portion of the pressure receiving surface r2: a distance from the center of the pressure receiving surface 15 to a center of the outflow hole 13a r3: a distance from the center of the outflow hole 13a to an inner wall of the outflow hole 13a r4: a distance from a center of the pressure receiving section 16 to an end portion of the pressure receiving section FIG. 4 is a perspective sectional view taken along line A-A' of the liquid chamber 11 which is formed in the housing 14 of the first embodiment.

As shown in FIG. 4, the housing inner wall 19 has a bottom surface 19a that faces the pressure receiving surface 15, and a side surface 19b for connecting the bottom surface 19a and the pressure receiving surface 15 to demarcate the liquid chamber 11. In the side surface 19b, a portion designated by reference sign 30 is a connecting portion that is connected to the pressure receiving surface 15.

The connecting portion 30 is a part of the side surface 19b and is present in a distance of substantially r1 from the center line CL. As shown in FIG. 4, in a position in which the outflow hole 13a is present, the connecting portion is formed to be an inner wall of the outflow hole 13a as shown by reference sign 30a. The connecting portion 30a protrudes more outward of the liquid chamber 11 than the other connecting portion 30 adjacent to the connecting portion 30a. Here, "outward" refers to a direction toward the side surface 19b of the housing inner wall 19 from the center line CL.

Figure 5:
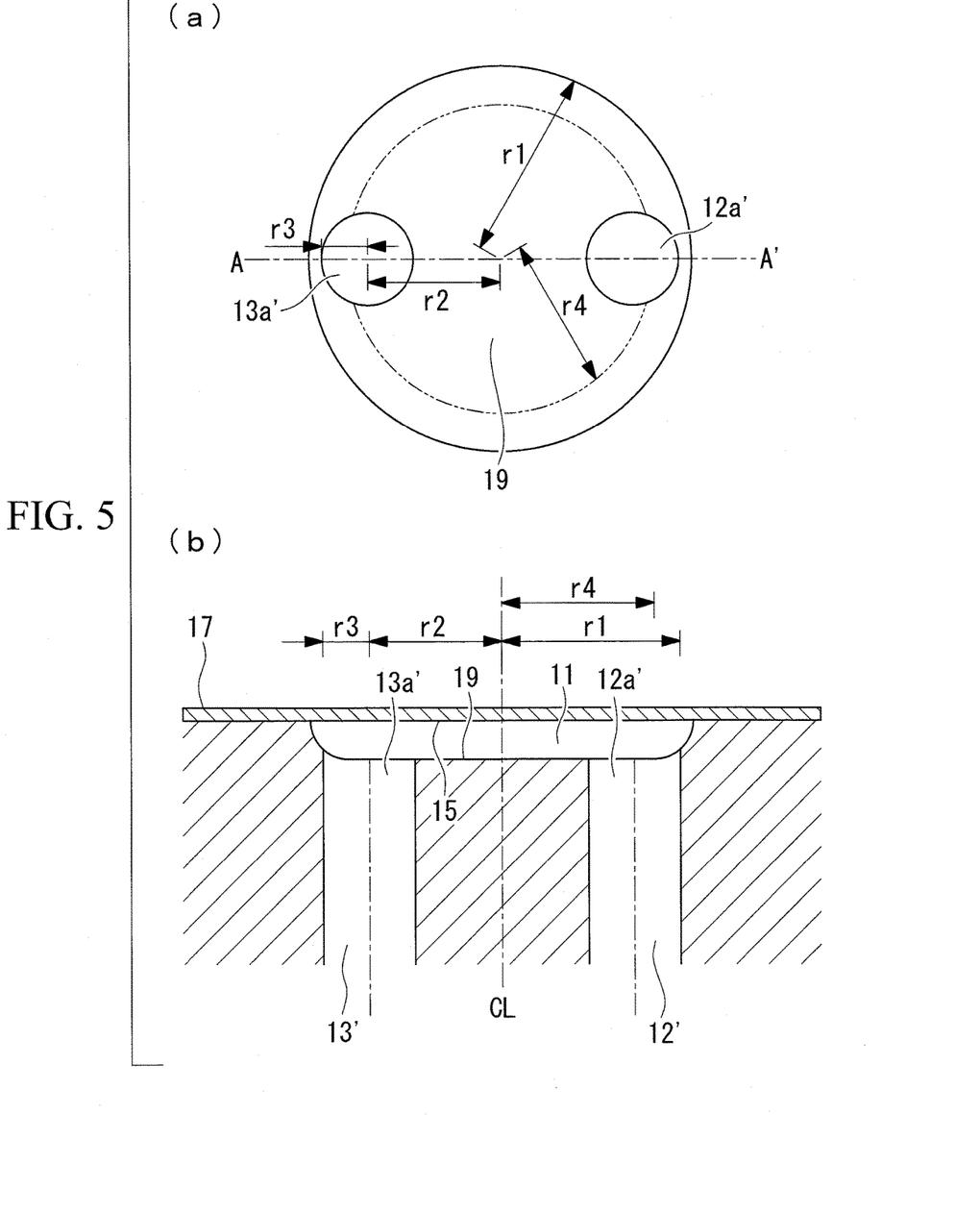
FIG. 5 is a view showing an inflow hole 12a' and an outflow hole 13a' of a comparative example of the first embodiment, (a) is a plan view seen in the center line CL direction from above the housing, and (b) is a sectional view taken along line A-A' in (a).

Next, a comparative example of the first embodiment will be described with use of FIG. 5 and FIG. 6. FIG. 5 is a view showing an inflow hole 12a' and an outflow hole 13a' of the comparative example of the first embodiment. FIG. 5(a) is a plan view seen in the center line CL direction from above the housing 14, and FIG. 5(b) is a sectional view taken along line A-A' in FIG. 5(a). Further, FIG. 6 is a perspective sectional view taken along line A-A' of the liquid chamber 11 which is formed in the housing 14 of the comparative example of the first embodiment.

Figure 6:
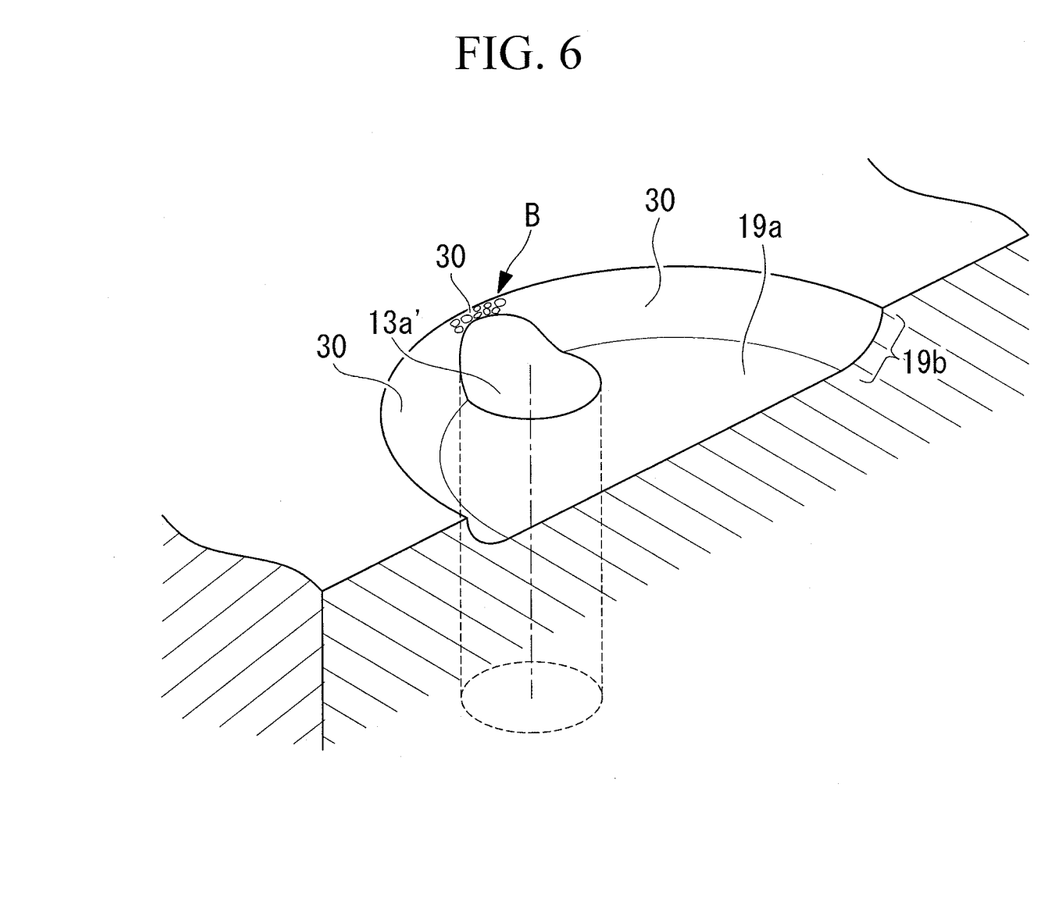
FIG. 6 is a perspective sectional view taken along line A-A' of the liquid chamber 11 formed in the housing 14 of the comparative example of the first embodiment.

As shown in FIG. 5 and FIG. 6, in the comparative example, in a position in which the outflow hole 13a' is present, the connecting portion 30 is not formed as an inner wall of the outflow hole 13a'. The connecting portion 30 in the position in which the outflow hole 13a' is present is at the same distance from the center line CL as the other adjacent connecting portion 30. In the connecting portion 30 in the position in which the outflow hole 13a' is present, the liquid does not smoothly flow, and therefore, air bubbles B shown in FIG. 6 easily stay. If the air bubbles B staying in the connecting portion 30 in the position in which the outflow hole 13a' is present collectively flow out, the flow rate of the liquid significantly varies.

As above, in the pressure sensor 10 of the first embodiment, at least a part of the connecting portion 30, which is connected to the pressure receiving surface 15, of the housing inner wall 19 which demarcates the liquid chamber 11 together with the pressure receiving surface 15 is formed as the inner wall of the outflow hole 13a. Further, the connecting portion 30a which is formed as the inner wall of the outflow hole 13a protrudes more outward of the liquid chamber 11 than the housing inner wall 19 of the other connecting portion 30 adjacent to the connecting portion 30a. Accordingly, the trouble can be restrained, in which air bobbles and the like stay in the connecting portion 30, which is connected to the pressure receiving surface 15, of the housing inner wall 19, and the air bubbles and the like which stay therein collectively flow out to vary the flow rate of the liquid.

In the pressure sensor 10 of the first embodiment, the inflow channel 12 causes the total amount of the liquid to flow into the liquid chamber 11 without branching the liquid which flows in from the outside of the pressure sensor 10 to another channel. Accordingly, the problem that the branched pipe portion becomes a dead volume, and the problem that the liquid staying in the branched pipe portion degrades can be avoided.

In order to establish a state in which the connecting portion 30a formed as the inner wall of the outflow hole 13a protrudes more outward of the liquid chamber 11 than the housing inner wall 19 of the other adjacent connecting portion 30, the values of r1, r2 and r3 mentioned above are desirably in a relation of the following conditional expression (1).

$$-0.5 \leq (r1-r2)/r3 \leq 0.9 \quad (1)$$

By satisfying the conditional expression (1), the space in which air bubbles and the like can stay in the connecting portion 30 which is connected to the pressure receiving surface 15 in the housing inner wall 19 can be decreased. This can restrain the trouble in which air bubbles and the like stay in the liquid chamber 11, and the air bubbles and the like which stay therein collectively flow out to vary the flow rate of the liquid.

Further, the values of r1, r2 and r3 mentioned above are desirably set to be in a relation of conditional expression (2) as follows.

$$0.5 \leq (r1-r2)/r3 \leq 0.8 \quad (2)$$

By satisfying conditional expression (2), the situation can be prevented, in which the center of the outflow hole 13a is in a position farther from the center of the pressure receiving surface 15 than the end portion of the pressure receiving surface 15 to reduce outflow efficiency of the liquid to the outflow hole 13a from the liquid chamber 11.

Further, in the pressure sensor 10, the values of r1, r2, r3 and r4 mentioned above are desirably set to be in a relation of conditional expression (3) as follows.

$$r2-r3 \leq r4 \leq r1 \quad (3)$$

By satisfying conditional expression (3), the trouble can be eliminated, in which the end portion of the pressure receiving section 16 is in a position that does not overlap the outflow hole 13a, and an area of the pressure receiving section 16 cannot be sufficiently ensured. Accordingly, the pressure sensor 10 in which the area of the pressure receiving section 16 is sufficiently ensured and detection precision of the pressure of the liquid is enhanced can be provided.

Note that in the first embodiment, in a position in which the inflow hole 12a is present, the connecting portion 30 is also formed to protrude outward of the liquid chamber 11. In this case, at least a part of the connecting portion 30 is formed as an inner wall of the inflow hole 12a, and the housing inner wall 19 at the portion which is formed as the inner wall of the inflow hole 12a is in a state protruding more outward of the liquid chamber 11 than the other connecting portion 30.

By doing as above, in the position in which the outflow hole 12a is present, the trouble can be restrained, in which air bobbles and the like stay in the connecting portion 30, which is connected to the pressure receiving surface 15, of the housing wall surface wall 19, and the air bubbles and the like which stay therein collectively flow out to vary the flow rate of the liquid.

In the pressure sensor 10 of the first embodiment, the center of the inflow hole 12a, the center of the outflow hole 13a and the center of the pressure receiving surface 15 are disposed on the same straight line, as shown in FIG. 3(a). By disposition like this, the liquid smoothly moves from the inflow hole 12a to the outflow hole 13a in the liquid chamber 11. Thereby, the trouble in which air bubbles and the like stay in the liquid chamber 11, and the air bubbles and the like which stay therein collectively flow out to vary the flow rate of the liquid can be further restrained.

Further, the housing 14 of the first embodiment is provided with the first connecting section 22 to which the first joint C1 is connected by being screwed thereon, and the second connecting section 23 to which the second joint C2 is connected by being screwed thereon. The inflow channel 12 is a channel that changes the flow direction of the liquid toward the center line CL direction substantially orthogonal to the pressure receiving surface 15 (described later) of the liquid chamber 11 from the same straight like as the first conduit P1. By doing as above, even when the liquid chamber 11 is not disposed on the same straight line as the first conduit P1 and the second conduit P2, the liquid can be caused to flow properly without providing a dead volume.

Further, in the pressure sensor 10 of the first embodiment, the first conduit P1 and the second conduit P2 are disposed substantially parallel with the pressure receiving surface 15, and the inflow channel 12 is the channel that changes the flow direction toward the direction substantially orthogonal to the pressure receiving surface 15 from the same straight line as the first conduit P1. Further, the outflow channel 13 is the channel that changes the flow direction toward the same straight line as the second conduit P2 from the direction substantially orthogonal to the pressure receiving surface 15. By doing as above, the liquid can be caused to flow in from the direction substantially orthogonal to the pressure receiving surface 15, and the liquid can be caused to flow out to the direction substantially orthogonal to the pressure receiving surface 15.

Second Embodiment

Figure 7:
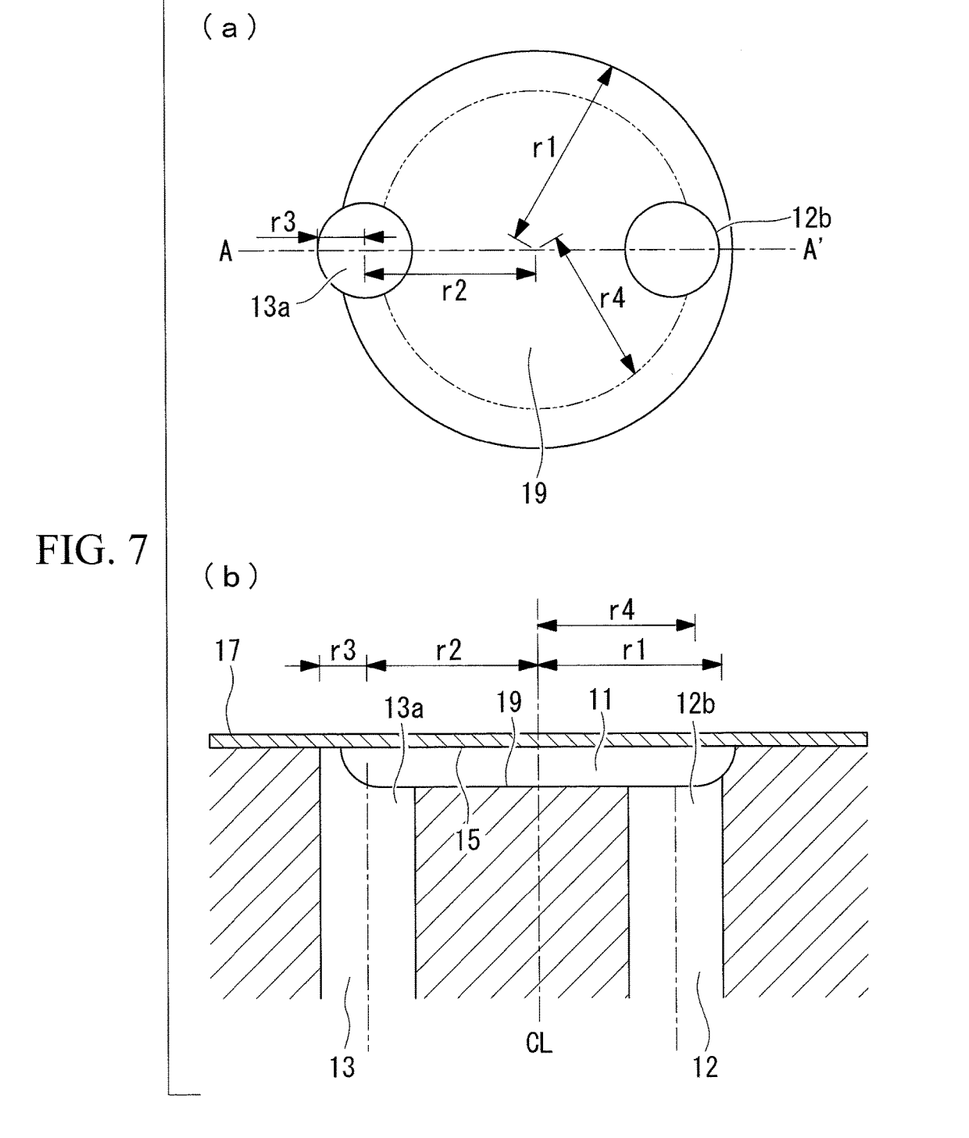
FIG. 7 is a view showing an inflow hole 12b and an outflow hole 13a of a second embodiment of the present invention, (a) is a plan view seen in the center line CL direction from above a housing, and (b) is a sectional view taken along line A-A' in (a).

Next, a second embodiment of the present invention will be described. The pressure sensor 10 of the second embodiment is a modification of the pressure sensor 10 of the first embodiment, and is similar to the pressure sensor 10 of the first embodiment except for a part that will be especially described as follows. In the first embodiment, the connecting portion 30 protrudes outward of the liquid chamber 11, in the position in which the inflow hole 12a is present. In contrast therewith, in the second embodiment, the connecting portion 30 is not protruded outward the liquid chamber 11, in the position in which the inflow hole 12a is present.

FIG. 7 is a view showing the inflow hole 12b and the outflow hole 13a of the second embodiment. FIG. 7(a) is a plan view seen in the center line CL direction from above the housing 14, and FIG. 7(b) is a sectional view taken along A-A' line in FIG. 7(a). As shown in FIG. 7, in the position in which the outflow hole 13a is present, the connecting portion 30 is protruded outward of the liquid chamber 11. In contrast therewith, in the position in which the inflow hole 12b is present, the connecting portion 30 is not protruded outward of the liquid chamber 11.

In the liquid chamber 11, a liquid that flows in from the inflow hole 12b flows out from the outflow hole 13a. Air bubbles and the like that are entrained in the liquid easily stay especially in the connecting portion 30 in the position in which the outflow hole 13a is present. Meanwhile, air bubbles and the like hardly stay in the connecting portion 30 in the position in which the inflow hole 12b is present. Accordingly, even if the connecting portion 30 is not protruded outward of the liquid chamber 11, in the position in which the inflow hole 12b is present, the trouble in which the flow rate of the liquid varies due to stay of air bubbles rarely occurs.

As above, in the second embodiment, in the position in which the inflow hole 12b is present, the connecting portion 30 is not protruded outward of the liquid chamber 11. By doing as above, the inflow hole 12b can be disposed at an optional position while air bubbles and the like are prevented from staying in the connecting portion 30 in the position in which the outflow hole 13a is present. Accordingly, the constraints on the occasion of designing the pressure sensor 10 can be decreased.

Third Embodiment

Next, a third embodiment of the present invention will be described. The pressure sensor 10 of the third embodiment is a modification of the pressure sensor 10 of the first embodiment, and is similar to the pressure sensor 10 of the first embodiment, except for a part that will be especially described as follows.

In the first embodiment, specific explanation of an installation position of the pressure sensor 10 is omitted. In contrast therewith, the pressure sensor 10 of the third embodiment specifies the installation position of the pressure sensor 10 in concrete.

Figure 8:
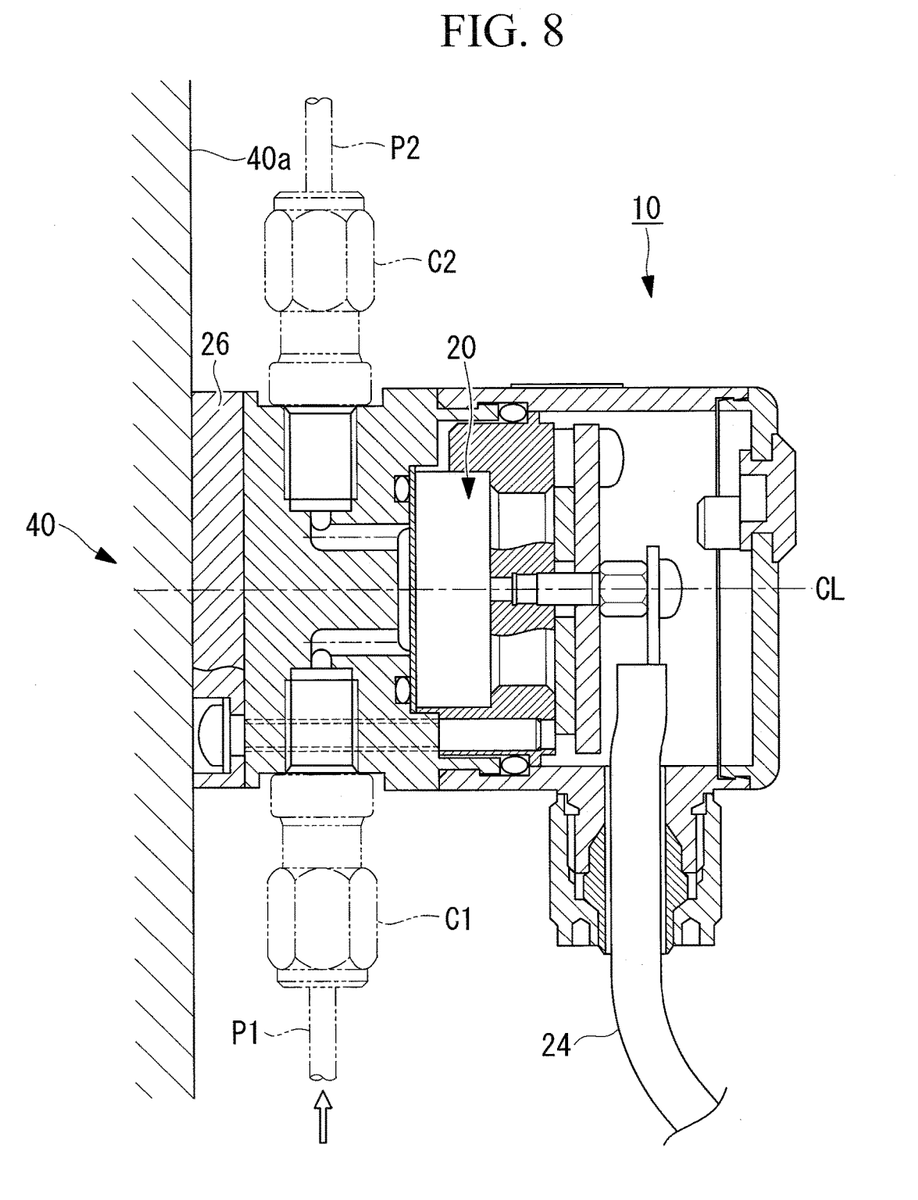
FIG. 8 is a sectional view showing an internal structure of a pressure sensor of a third embodiment of the present invention.

FIG. 8 is a sectional view showing an internal structure of the pressure sensor 10 of the third embodiment of the present invention. The configuration of the pressure sensor 10 is similar to that of the first embodiment, and therefore, explanation thereof will be omitted. The pressure sensor 10 of the third embodiment has a base 26 fixed to a fixed member 40. The fixed member 40 is a member such as a wall surface and a supporting strut, and has a fixing surface 40a to which the base 26 of the pressure sensor 10 can be fixed by a screw or the like.

The fixing surface 40a is a surface parallel with the vertical direction, and when the base 26 of the pressure sensor 10 is fixed thereto, the center line CL of the pressure sensor 10 is in a state orthogonal to the fixing surface 40a. Further, in the third embodiment, the center of the inflow hole 12a, the center of the outflow hole 13a and the center of the pressure receiving surface 15 are disposed on the same straight line, and a direction of the straight line corresponds to the vertical direction.

According to the pressure sensor 10 of the third embodiment installed as above, a liquid flows into the first conduit P1 from a lower position in the vertical direction, and flows out to the second conduit P2 at an upper position in the vertical direction. Further, the outflow hole 13a is disposed at an upper position in the vertical direction from the inflow hole 12a. Accordingly, in the pressure sensor 10 with the configuration as above, air bubbles and the like with specific gravities smaller than that of the liquid easily flow out of the outflow hole 13a. This can further restrain the trouble in which air bubbles and the like stay in the liquid chamber 11, and the air bubbles and the like which stay therein collectively flow out to vary the flow rate of the liquid.

Other Embodiments

The present invention is not limited to the embodiments described above, and can be properly changed within the range without departing from the scope of the invention.

REFERENCE SIGNS LIST

10 PRESSURE SENSOR
11 LIQUID CHAMBER
12 INFLOW CHANNEL
12a, 12b INFLOW HOLE
13 OUTFLOW CHANNEL
13a OUTFLOW HOLE
14 HOUSING
15 PRESSURE RECEIVING SURFACE
16 PRESSURE RECEIVING SECTION
17 SHEET
19 HOUSING INNER WALL
20 PRESSURE DETECTOR
30 CONNECTING PORTION
30a CONNECTING PORTION FORMED AS INNER WALL OF OUTFLOW HOLE
CL CENTER LINE

The invention claimed is:

1. A pressure sensor, comprising:
a pressure detector that has a pressure receiving surface in contact with a liquid, and detects a pressure of the liquid to a pressure receiving section included in the pressure receiving surface; and
a housing having a housing inner wall that demarcates a liquid chamber together with the pressure receiving surface,
wherein the housing inner wall is provided with an inflow hole that causes the liquid to flow into the liquid chamber, and an outflow hole that causes the liquid to flow out of the liquid chamber, the housing inner wall having a bottom surface that faces the pressure receiving surface and a side surface that connects the bottom surface and the pressure receiving surface,
a part of a connecting portion, which is connected to the pressure receiving surface, of the side surface is formed as an inner wall of the outflow hole, and
when seen in a direction of a center line orthogonal to the pressure receiving surface, a part of the connecting portion formed as the inner wall of the outflow hole protrudes outward of the liquid chamber from the other part of the connecting portion adjacent to the portion part of the connecting portion formed as the inner wall of the outflow hole.

2. The pressure sensor according to claim 1,
wherein the housing has an inflow channel that causes a liquid that flows in from an outside of the pressure sensor to flow into the liquid chamber, and
the inflow channel causes the liquid that flows in from the outside of the pressure sensor to flow into the liquid chamber without branching the liquid to another channel.

3. The pressure sensor according to claim 1,
wherein a plan view of the pressure receiving surface is substantially circular, and
a conditional expression as follows is satisfied:

$$-0.5 \leq (r1-r2)/r3 \leq 0.9$$

where
r1: a distance from a center of the pressure receiving surface to an end portion of the pressure receiving surface,
r2: a distance from the center of the pressure receiving surface to a center of the outflow hole, and
r3: a distance from the center of the outflow hole to an inner wall of the outflow hole.

4. The pressure sensor according to claim 3,
wherein a conditional expression as follows is satisfied:

$$0.5 \leq (r1-r2)/r3 \leq 0.8.$$

5. The pressure sensor according to claim 1,
wherein a plan view of the pressure receiving surface is substantially circular,
a plan view of the pressure receiving section is substantially circular, and
a conditional expression as follows is satisfied:

$$r2-r3 \leq r4 \leq r1$$

where
r1: a distance from a center of the pressure receiving surface to an end portion of the pressure receiving surface,
r2: a distance from the center of the pressure receiving surface to a center of the outflow hole,
r3: a distance from the center of the outflow hole to an inner wall of the outflow hole, and
r4: a distance from the center of the pressure receiving section to an end portion of the pressure receiving section.

6. The pressure sensor according to claim 1,
wherein part of the connecting portion is formed as an inner wall of the inflow hole, and
when seen in the direction of the center line, a part of the connecting portion formed as the inner wall of the inflow hole protrudes outward of the liquid chamber from the other part of the connecting portion adjacent to the part of the connecting portion formed as the inner wall of the inflow hole.

7. The pressure sensor according to claim 1,
wherein a center of the inflow hole, a center of the outflow hole, and a center of the pressure receiving surface are disposed on a same straight line.

8. The pressure sensor according to claim 7,
wherein the same straight line is in a vertical direction, and the outflow hole is disposed at an upper position in the vertical direction.

9. The pressure sensor according to claim 2,
wherein the housing comprises
a first connecting section to which a joint provided at a first conduit in which a liquid flowing into the pressure sensor flows is connected,
a second connecting portion to which a joint provided at a second conduit in which the liquid flowing out of the pressure sensor flows is connected, and
an outflow channel that changes a flow direction from the outflow hole of the liquid chamber to a same straight line as the second conduit, and
the inflow channel changes the flow direction from a same straight line as the first conduit to the inflow hole of the liquid chamber.

10. The pressure sensor according to claim 9,
wherein the first conduit and the second conduit are disposed substantially parallel with the pressure receiving surface,
the inflow channel is a channel that changes a flow direction from the same straight line as the first conduit to a direction substantially orthogonal to the pressure receiving surface, and
the outflow channel is a channel that changes a flow direction from the direction substantially orthogonal to the pressure receiving surface to the same straight line as the second conduit.

11. The pressure sensor according to claim 2,
wherein a plan view of the pressure receiving surface is substantially circular, and
a conditional expression as follows is satisfied:

$$-0.5 \leq (r1-r2)/r3 \leq 0.9$$

where
r1: a distance from a center of the pressure receiving surface to an end portion of the pressure receiving surface,
r2: a distance from the center of the pressure receiving surface to a center of the outflow hole, and
r3: a distance from the center of the outflow hole to an inner wall of the outflow hole.

12. The pressure sensor according to claim 2,
wherein a plan view of the pressure receiving surface is substantially circular,
a plan view of the pressure receiving section is substantially circular, and
a conditional expression as follows is satisfied:

$$r2-r3 \leq r4 \leq r1$$

where
r1: a distance from a center of the pressure receiving surface to an end portion of the pressure receiving surface,
r2: a distance from the center of the pressure receiving surface to a center of the outflow hole,
r3: a distance from the center of the outflow hole to an inner wall of the outflow hole, and
r4: a distance from the center of the pressure receiving section to an end portion of the pressure receiving section.

13. The pressure sensor according to claim 3,
wherein a plan view of the pressure receiving surface is substantially circular,
a plan view of the pressure receiving section is substantially circular, and
a conditional expression as follows is satisfied:

$$r2-r3 \leq r4 \leq r1$$

where
r1: a distance from a center of the pressure receiving surface to an end portion of the pressure receiving surface,
r2: a distance from the center of the pressure receiving surface to a center of the outflow hole,
r3: a distance from the center of the outflow hole to an inner wall of the outflow hole, and
r4: a distance from the center of the pressure receiving section to an end portion of the pressure receiving section.

14. The pressure sensor according to claim 4,
wherein a plan view of the pressure receiving surface is substantially circular, a plan view of the pressure receiving section is substantially circular, and a conditional expression as follows is satisfied:

$$r2-r3 \leq r4 \leq r1$$

where r1: a distance from a center of the pressure receiving surface to an end portion of the pressure receiving surface, r2: a distance from the center of the pressure receiving surface to a center of the outflow hole, r3: a distance from the center of the outflow hole to an inner wall of the outflow hole, and r4: a distance from the center of the pressure receiving section to an end portion of the pressure receiving section.

15. The pressure sensor according to claim 2,
wherein at least a part of the connecting portion is formed as an inner wall of the inflow hole, and
the housing inner wall at the portion formed as the inner wall of the inflow hole protrudes more outward of the liquid chamber than the other connecting portion adjacent to the portion formed as the inner wall of the inflow hole.

16. The pressure sensor according to claim 3,
wherein at least a part of the connecting portion is formed as an inner wall of the inflow hole, and
the housing inner wall at the portion formed as the inner wall of the inflow hole protrudes more outward of the liquid chamber than the other connecting portion adjacent to the portion formed as the inner wall of the inflow hole.

17. The pressure sensor according to claim 4,
wherein at least a part of the connecting portion is formed as an inner wall of the inflow hole, and
the housing inner wall at the portion formed as the inner wall of the inflow hole protrudes more outward of the liquid chamber than the other connecting portion adjacent to the portion formed as the inner wall of the inflow hole.

18. A pressure sensor, comprising:
a pressure detector that has a pressure receiving surface in contact with a liquid, and detects a pressure of the liquid to a pressure receiving section included in the pressure receiving surface; and
a housing having a housing inner wall that demarcates a liquid chamber together with the pressure receiving surface,
wherein the housing inner wall is provided with an inflow hole that causes the liquid to flow into the liquid chamber, and an outflow hole that causes the liquid to flow out of the liquid chamber,
at least a part of a connecting portion, which is connected to the pressure receiving surface, of the housing inner wall is formed as an inner wall of the outflow hole, and
the housing inner wall at the portion formed as the inner wall of the outflow hole protrudes more outward of the liquid chamber than the other connecting portion adjacent to the portion formed as the inner wall of the outflow hole,
wherein a plan view of the pressure receiving surface is substantially circular, and
a conditional expression as follows is satisfied:

$$-0.5 \leq (r1-r2)/r3 \leq 0.9$$

where r1: a distance from a center of the pressure receiving surface to an end portion of the pressure receiving surface, r2: a distance from the center of the pressure receiving surface to a center of the outflow hole, and r3: a distance from the center of the outflow hole to an inner wall of the outflow hole.

19. A pressure sensor, comprising:
a pressure detector that has a pressure receiving surface in contact with a liquid, and detects a pressure of the liquid to a pressure receiving section included in the pressure receiving surface; and
a housing having a housing inner wall that demarcates a liquid chamber together with the pressure receiving surface,
wherein the housing inner wall is provided with an inflow hole that causes the liquid to flow into the liquid chamber, and an outflow hole that causes the liquid to flow out of the liquid chamber,
at least a part of a connecting portion, which is connected to the pressure receiving surface, of the housing inner wall is formed as an inner wall of the outflow hole, and
the housing inner wall at the portion formed as the inner wall of the outflow hole protrudes more outward of the liquid chamber than the other connecting portion adjacent to the portion formed as the inner wall of the outflow hole,
wherein a plan view of the pressure receiving surface is substantially circular,
a plan view of the pressure receiving section is substantially circular, and
a conditional expression as follows is satisfied:

$$r2-r3 \leq r4 \leq r1$$

where r1: a distance from a center of the pressure receiving surface to an end portion of the pressure receiving surface, r2: a distance from the center of the pressure receiving surface to a center of the outflow hole, r3: a distance from the center of the outflow hole to an inner wall of the outflow hole, and r4: a distance from the center of the pressure receiving section to an end portion of the pressure receiving section.

* * * * *